United States Patent [19]

Pophillat

[11] Patent Number: 5,151,698
[45] Date of Patent: Sep. 29, 1992

[54] METHOD FOR THE CODING OF A DIGITAL SIGNAL, CODER AND DECODER TO IMPLEMENT THIS METHOD, REGENERATION METHOD AND CORRESPONDING REGENERATOR UTILIZING PULSE POSITION MODULATION

[75] Inventor: Lucien Pophillat, Lannion, France

[73] Assignee: French State Represented by the Minister of Post, Telecommunications and Space (centre National d'Etudes des Telecommunications), France

[21] Appl. No.: 584,476

[22] Filed: Sep. 18, 1990

[30] Foreign Application Priority Data

Sep. 19, 1989 [FR] France .................. 89 12274

[51] Int. Cl.$^5$ ............................................. H03M 5/02
[52] U.S. Cl. ............................................. 341/52; 375/23
[58] Field of Search .................. 341/68, 69, 70, 71, 341/72, 73, 74, 87, 63, 64, 52; 455/608, 609, 611; 370/8, 10; 375/23; 332/112

[56] References Cited

U.S. PATENT DOCUMENTS

| | | | |
|---|---|---|---|
| 4,201,909 | 5/1980 | Dogliotti et al. | 455/608 |
| 4,584,720 | 4/1986 | Garrett | 455/608 |

FOREIGN PATENT DOCUMENTS 0102815 3/1984 United Kingdom .

OTHER PUBLICATIONS

IEEE Transactions On Communications, vol. CO-M-31, No. 4, Apr. 1983, pp. 518–527, IEEE, N.Y., US; I. Garrett: "Pulse-position modulation for Transmission Over Optical Fibers with Direct or Heterodyne Detection".

IBM Technical Disclosure Bulletin, vol. 29, No. 1, Jun. 1986, pp. 280–282, N.Y., US: "Time Division Pulse Modulation".

Primary Examiner—A. D. Pellinen
Assistant Examiner—B. K. Young
Attorney, Agent, or Firm—Pearne, Gordon, McCoy & Granger

[57] ABSTRACT

Method for coding a digital signal, a coder and decoder for implementing this method, a regeneration method and a corresponding regenerator. On each bit time, a detection is made of the possible presence of a binary pattern from any number "n" of binary patterns including at least two bits; the bit time is divided into "n" equal time intervals to which "n" temporal positions are associated; a correspondence is established between each of "n" binary patterns and each of "n" temporal positions; if one of the binary patterns is present, a pulse occupying a temporal position corresponding to the binary pattern is generated and the next detection for the possible presence of a binary pattern is made from the bit following the last bit of the binary pattern whose presence is detected.

15 Claims, 6 Drawing Sheets

METHOD FOR THE CODING OF A DIGITAL SIGNAL, CODER AND DECODER TO IMPLEMENT THIS METHOD, REGENERATION METHOD AND CORRESPONDING REGENERATOR UTILIZING PULSE POSITION MODULATION

FIELD OF THE INVENTION

The object of the present invention is to provide a method to code a binary digital signal in the form of unipolar pulses of constant duration able to assume several positions inside a time interval equal to the period of one bit time. The object of the invention is also to provide a coder and decoder implementing this method. Finally, the object of the invention is to provide a regenerator and method to regenerate a coded noised signal according to said method. This invention can in particular be advantageously applied in digital optical fiber transmission systems using direct detection.

BACKGROUND OF THE INVENTION

The natural and also the simplest code for the transmission of a digital signal is the NRZ (Non-return to zero) code, also known as pure binary. There are known to be many other codes. Those more usually distinguished are the codes which modify the format of the digital signal and the codes which consist of adding additional bits, which increases the thruput but does not modify the format of the digital signal. Amongst the first codes, one can quote as an example the RZ code (Return to Zero), the AMI code (Alternate Mark Inversion), the CMI code (Coded Mark Inversion) and the Miller code. The second codes are of the nBmB type, in other words at n bits they make m bits to correspond with m>n. They may be used to embody a precoding prior to a coding following one of the first above mentioned codes.

These codes are used to respond to specific needs such as the facility of retrieving the clock, the possibility of detecting transmission errors, and compatibility of the energy spectrum of the coded signal with the transmission support.

As regards optical fiber digital transmission systems using direct detection, the codes procuring the best possible sensitivity or, in other words, the codes authorizing the lowest mean optical power at the input of the photoreceptor for a given error rate on the regenerated binary signal, are the NRZ and RZ codes. This is why these codes are used in the principal transmission experiments seeking sensitivity performance. These experiments are referred to in the article by B. L. KASPER and J. C. CAMPBELL and entitled: "Multigigabit-per-second Avalanche Photodiode Lightwave Receivers" published in the Journal of Lightwave Technology, vol. LT-5, no 10, Oct. 1987, p. 1361.

SUMMARY OF THE INVENTION

The object of the present invention is to transmit a digital signal by means of an optical fiber system using direct detection with a better sensitivity than that provided by an NRZ or RZ code. To this effect, it is to be noted that an NRZ or RZ signal is constituted by one pulse for each "1". In a digital signal, all the "1's" are not isolated and single binary patterns, as for example two consecutive "1's", often repeat. In addition, it is possible to modify the temporal position of the pulse inside the bit time so as to obtain information supplementary to the binary information in the presence or absence of the pulse. Thus, it is possible to replace two consecutive "1's" by a single pulse, the additional information then conveyed by the pulse being marked by a modification of its temporal position inside the bit time. The reduction thus obtained of the average number of pulses per unit of time results in a reduction of the average optical power transmitted and accordingly an increase of sensitivity.

This sensitivity increase is only real if the error probability relating to the decision between two adjacent pulse temporal positions is not greater than the error probability relating to the decision between the presence or absence of the pulse.

The invention enables this condition to be satisfied which unmarks it from a known coding method known as DPPM (Digital Pulse Position Modulation) which also codes the digital signal in the form of unipolar pulses of constant duration able to assume several temporal positions within a time interval.

In order to more fully understand the significance of the invention, it would be proper to refer to the functioning of DPPM modulation. There exists a detailed study of DPPM applied to optical fiber transmissions in the article by I. GARRETT and entitled: "Pulse-position modulation for transmission over optical fibers with direct or heterodyne detection" published in IEEE Transactions on communications, vol. COM-31, No 4, April 1983, pp. 518–527.

Figure 1:
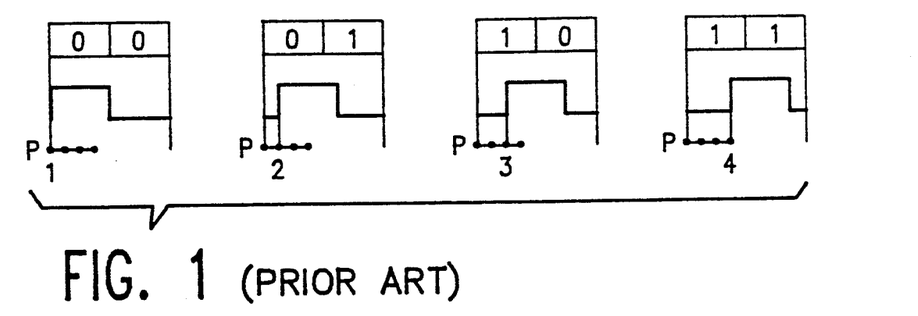
FIG. 1, already described, gives a known coding example according to DPPM.

FIG. 1 annexed shows a simple example of DPPM coding in which the digital signal has been cut into two bit cells. Thus, four cells are obtained having different binary compositions to which four temporal pulse positions are associated, namely P1 to P4. In addition, the pulse period is selected as being equal to the period of the bit time. It is possible to take a shorter pulse period, but this would require a higher pass-band for transmission of the signal. It can be clearly seen that in these conditions, the time interval separating two adjacent pulse temporal positions may not exceed one quarter of the bit time.

Figure 2:
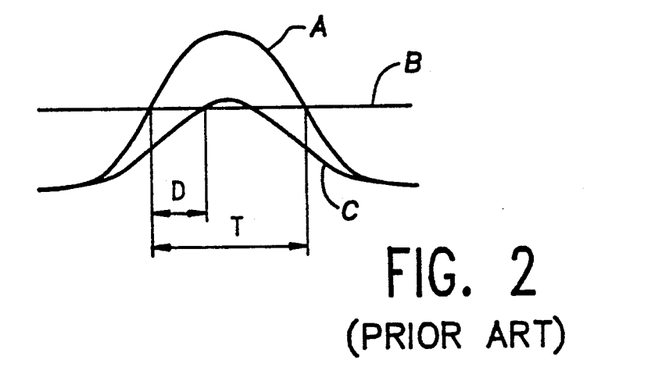
FIG. 2, already described, illustrates a known method for obtaining the information of the temporal position of a pulse.

The extraction of the information of the temporal position of a pulse for the regeneration of a DPPM signal is illustrated in FIG. 2.

This figure shows a pulse A of width T at midheight. This pulse is not rectangular but has a particular shape given by the transfer function of the filter preceding the decision circuit deliberately designed to maximize the ratio between the peak amplitude of the pulse and the noise level. The pulse A is compared to a threshold B generally situated at midheight of its amplitude. The figure also shows a pulse C affected by a noise component so that its peak amplitude is slightly greater than the threshold B. Thus, the decision concerning the presence of the pulse C may be taken without error occurring. In a known way, the information taken into account to determine the temporal position of a pulse, in the case of regenerating a DPPM signal, originates from the time on which the rising front of this pulse crosses the threshold B. The error D on this date may thus approach a value nearing +T/2 before the noise component affecting a pulse results in an erroneous decision concerning the pulse presence or absence.

When the time interval separating two adjacent temporal positions is equal to T/4, as in the example of FIG. 1, the error concerning the position of the pulse shall be less than ±T/8 so to avoid resulting in the presence of errors in the regenerated binary signal. According to the mode of regeneration of a DPPM signal illustrated on FIG. 2, the error probability relating to the decision between two pulse positions spaced from T/4 shall thus be greater than the error probability relating to the decision between any pulse presence or absence, which constitutes a drawback.

The object of the present invention is to overcome this drawback.

More precisely, the method of the invention consists of detecting, on each bit time, the possible presence of a binary pattern from any number n of binary patterns including at least two bits, of dividing said bit time into n equal time intervals to which n temporal positions are associated, of establishing a correspondence between each of n binary patterns and each of n temporal positions, of generating, if one of the n binary patterns is present, a pulse occupying a temporal position corresponding to said binary pattern and of then carrying out the next detection of the possible presence of a binary pattern from the bit following the last bit of said binary pattern whose presence is detected.

The bit time on which detection of the possible presence of a binary pattern corresponds to the first bit or even to the last bit of this binary pattern.

The period of the pulse may be any period, but preferably about 2T/n.

The composition of the binary patterns may also be any. Of course, it is advantageous to select binary patterns which minimize the average number of pulses transmitted per unit of time. When the digital signal to be coded may contain long series of consecutive "0's", it is preferable that one of the patterns also only contains "0's" so that the maximum period separating two consecutive pulses is not too long. This facilitates the retrieval of the clock and reduces the level of low frequency components of the energy spectrum of the coded signal.

Thus, it is possible to detect the presence of the following binary patterns, given by way of explanation but being in no way restrictive : "10" and "11", or "10", "110" and "111", or "11", "100" and "101" or "10", "11" and any number of consecutive "0's", or "10", "110", "1110" and "1111", or "100", "110", "111" and "101", or "10", "110", "111" and any number of consecutive "0's" or even "100", "11", "101" and any number of consecutive "0's".

The object of the invention is also to provide a coder to implement this method. It includes a device to detect, on each bit time, the possible presence of a binary pattern from n binary patterns, a device to produce, once the presence of a binary pattern is detected, a pulse occupying a temporal position corresponding to said binary pattern and a device to then carry out the next detection from the bit following the last bit of said binary pattern whose presence is detected.

The object of the invention is also to provide a decoder to supply a binary digital signal from a signal coded according to the method of the invention and including a device to detect the presence of a pulse occupying a temporal position from n temporal positions and a device to produce, once a pulse is detected in a temporal position, a binary pattern corresponding to this temporal position.

Another object of the invention is to provide a method to regenerate a noised signal coded according to the coding method defined above and which consists of carrying out a first test on a first signal so as to take an optimal decision between the absence and presence of a pulse and at least one second test on at least one second signal so as to take an optimal decision between two adjacent temporal positions.

A method for obtaining a second signal consists of taking up the slope of the coded signal, previously filtered.

Finally, the object of the invention is to provide a regenerator implementing the regeneration method defined above and including a device to carry out a pulse absence/presence test for each of n temporal positions, a device to carry out a pulse presence validation test for each of n temporal positions, a set of n logical operators to carry out the validation operations, a device to inhibit any validated pulse presence detection of any pulse in the two temporal positions following the temporal position in which the validated presence of a pulse is detected, a device to produce, once the validated presence of a pulse is detected in a temporal position, a binary pattern corresponding to this temporal position, a device to retrieve the clock of the signal transmitted and a time base to produce the control signals of the pulse absence/presence tests and pulse presence validation tests for each of n temporal positions.

BRIEF DESCRIPTION OF THE DRAWINGS

The characteristics and advantages of the invention shall appear more readily from a reading of the following description, given by way of explanation and being in no way restrictive, with reference to the accompanying figures in which.

DETAILED DESCRIPTION OF THE PREFERRED EMBODIMENTS

The principle of the invention may be explained with reference to FIGS. 3 and 4 to be compared with FIGS. 1 and 2, already described regarding the prior art.

Figure 3:
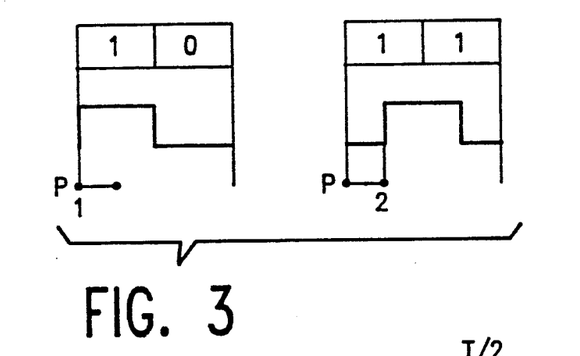
FIG. 3 illustrates the principle of the coding according to the invention.
Figure 4:
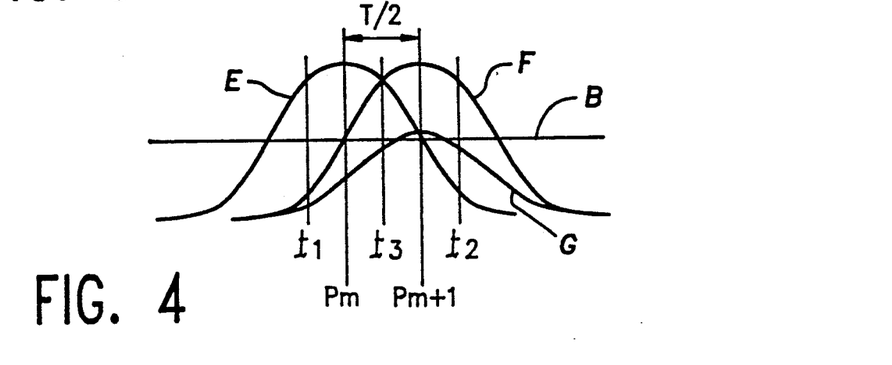
FIG. 4 shows the method for obtaining the temporal position information of a pulse.

FIG. 3 shows a coding example according to the invention and using a pulse with the same period as that on FIG. 1. In this example, the binary patterns "10" and "11" are respectively represented by a pulse in a temporal position P1 and a pulse in a temporal position P2. The presence of these binary patterns is not detected with a constant periodicity as in DPPM, but with any periodicity, in other words the presence of a binary pattern is detected immediately it appears. When the presence of none of these two binary patterns is detected, no pulse is transmitted. In this way, it is possible to code any binary signal. In this coding example according to the invention, two pulse temporal positions suffice, which makes it possible to allocate a time interval between two adjacent temporal positions equal to half the bit time.

One advantage of the coding illustrated by FIG. 3, when compared with the coding illustrated by FIG. 1, resides in the fact that the time interval between two adjacent temporal positions is twice larger. This advantage is expressed by a lower error probability relating to the decision between two adjacent temporal positions in identical noise/signal ratio conditions and accordingly results in an increase of sensitivity.

Another advantage concerns the average number of pulses transmitted per unit of time. In the example shown on FIG. 1, it shall be observed that a pulse is systematically transmitted for two bits. On the other hand, in the example shown on FIG. 3, sometimes one pulse is transmitted for one "1" and sometimes one pulse for two "1's". Thus on average less than one pulse is transmitted for two bits by, however, considering that the digital signal to be coded is balanced, that is it contains on average as many "1's" as "0's". This lower value of the average number of pulses transmitted per unit of time also results in an increase of sensitivity.

The invention makes it possible to regenerate a signal coded according to the method with an error probability, relating to the decision between two adjacent temporal positions, smaller than that obtained according to the method for obtaining the temporal position information illustrated on FIG. 2. To this end, the information used to determine the temporal position of a pulse is no longer the date on which the rising front of this pulse crosses a threshold, but the amplitude of a new signal whose two production modes are now to be illustrated with reference to FIG. 4. This figure shows two pulses E and F with a width T at mid-height and identical to the pulse A, and a pulse G identical to the pulse C. The pulse E is centered in any temporal position Pm and the pulses F and G are centered in the temporal position Pm+1 so that Pm+1−Pm=T/2. Thus, the pulses E and F occupy two temporal positions spaced from T/2, as shown in the example of FIG. 3. A method to obtain information of the temporal position of the pulses E or F consists of taking the amplitude on the dates t1 and t2 so that t1=Pm-T/4 and t2=Pm+1+T/4. In fact, it is on the dates t1 and t2 that the difference between the amplitudes of the pulses E and F is maximal. Thus, when the difference between the amplitude on the date t2 and the amplitude on the date t1 is negative, it is possible to deduce from this that a pulse is present centered in the temporal position Pm. Similarly, when the difference between the amplitude on the date t2 and the amplitude on the date t1 is positive, it is possible to deduce from this that a pulse is present centered in the temporal position Pm+1.

Another method for obtaining information of the temporal position of the pulses E or F consists of taking the slope on the date t3 centered between the temporal positions Pm and Pm+1. In fact, it is on the date t3 that the difference between the slopes of the pulses E and F is maximal. Thus, when the slope on the date t3 is negative, it is possible to deduce from this that a pulse is present centered in the temporal position Pm. Similarly, when the slope on the date t3 is positive, it is possible to deduce from this that a pulse is present centered in the temporal position Pm+1.

According to either of the two above-mentioned methods for obtaining information of the temporal position of a pulse, the decision concerning the temporal position of the pulse G shall not be erroneous. In fact, it is clear that firstly the difference between the amplitudes of the pulse G on the dates t2 and t1 is positive, and secondly that the slope of the pulse G on the date t3 is positive.

Figure 5:
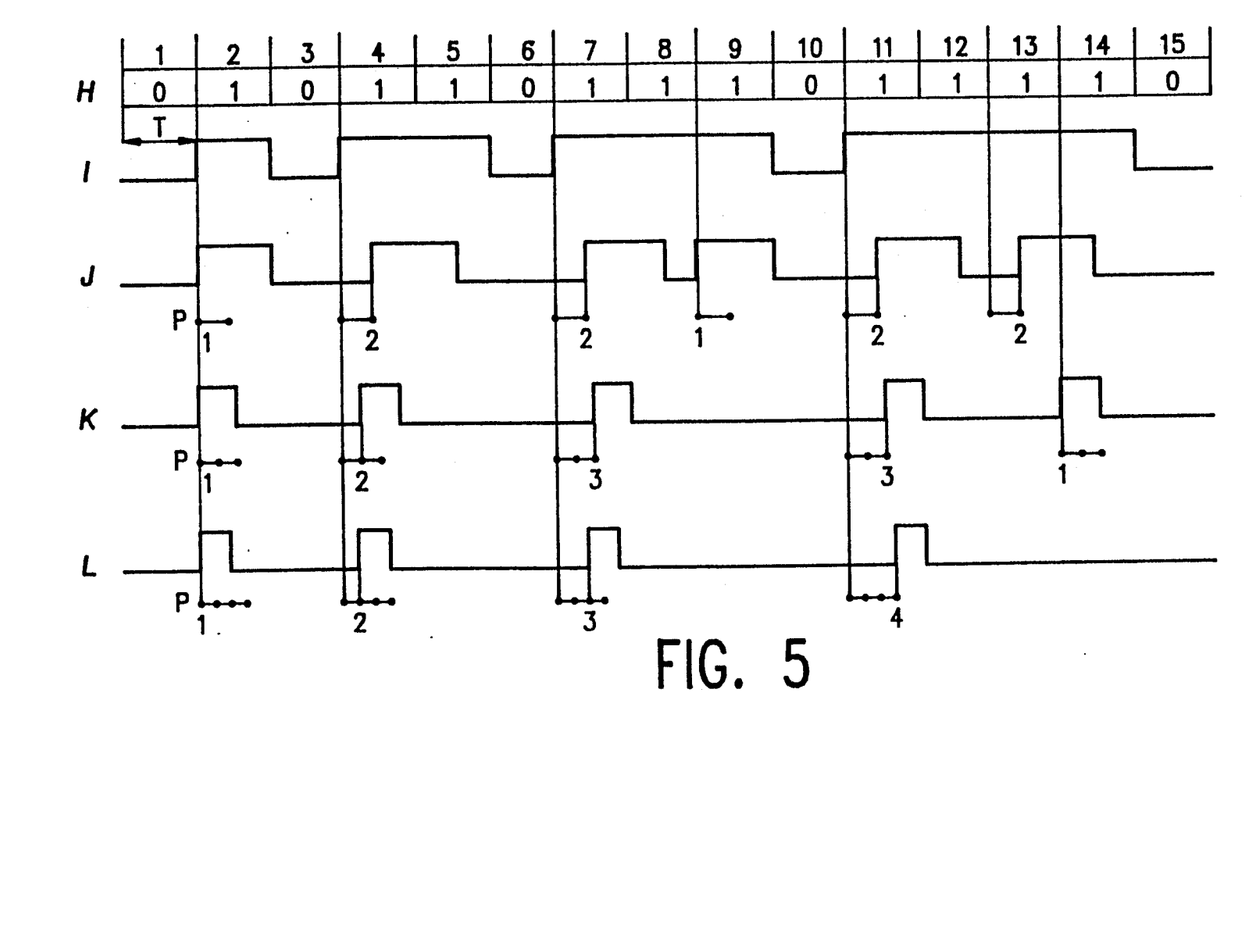
FIG. 5 represents examples of signals obtained according to the coding method of the invention.

There now follows a more detailed explanation of the coding method of the invention with reference to the signals of FIG. 5. This figure shows at H a binary sequence with a period T including 15 bits numbered from 1 to 15. This sequence comprises examples of binary patterns whose presence is advantageously detected in accordance with the invention. The signal I is a digital signal with the format NRZ and corresponding to the sequence H.

The signals J, K and L are signals coded according to the method of the invention and in which the pulses are able to assume two temporal positions P1 and P2 respectively corresponding to the binary patterns "10" and "11" (signal J), three temporal positions P1, P2 and P3 respectively corresponding to the binary patterns "10", "110" and "111" (signal K), and four temporal positions P1, P2, P3 and P4 respectively corresponding to the binary patterns "10", "110", "1110" and "1111" (signal L).

Thus, the first pulse of the signal J, whose rise front is in the temporal position P1 of the bit time No 2, corresponds to the binary pattern "10" composed of bits No 2 and 3 and whose presence is detected on the bit time No 2. The second pulse of the signal J, whose rise front is in the temporal position P2 of the bit time No 4, corresponds to the binary pattern "11" composed of bits No 4 and 5 and whose presence is detected on the bit time No 4.

Similarly, the second pulse of the signal K, whose rise front is in the temporal position P2 of the bit time No 4, corresponds to the binary pattern "110" composed of bits No 4, 5 and 6 and whose presence is detected at the bit time No 4, and the last pulse of the signal L, whose rise front is in the temporal position P4 of the bit time No 11, corresponds to the binary pattern "1111" composed of bits No 11, 12, 13 and 14 and whose presence is detected in the bit time No 11.

According to one characteristic of the method of the invention, the time intervals separating two adjacent temporal positions relating to the signals J, K and L are respectively equal to T/2, T/3 and T/4.

According to one preferred characteristic of the method of the invention, the periods of the pulses relating to the signals J, K and L are respectively equal to T, 2T/3 and T/2.

The signals, such as the signals J, K or L, coded according to the method of the invention may be used advantageously in optical fiber transmission systems using direct detection. It is also possible to use them in the form of an amplitude modulation of an optical carrier in association with a coherent detection (heterodyne or homodyne), but being less advantageous as in coherent detection, the amplitude modulation is less effective in terms of sensitivity than other modulations, such as the phase modulation of the optical carrier.

The signal J, whose pulses have a period equal to T, require for its transmission the same band width as the NRZ type signal I. The signals L and L require for their transmission larger band widths inversely proportional to the period of their respective pulses.

For a given pulse amplitude, it may be observed that the average power relating to the signal K is much weaker than the average power relating to the signal J. In fact, the pulses of the signal K, when compared with the pulses of the signal J, have a shorter period and their average number per unit of time is also less. The same observations are applicable between the signals L and K.

The elements influencing the choice between, for example, the signals J, K and L are thus firstly the characteristics of the transmission channel concerning the band width and the noise/signal ratio at the output of the receiver associated with this band width, and secondly the characteristics of the transmission source concerning the maximum power able to be transmitted. This maximum power may be a peak power and, in this case, the signal J, which has the smallest ratio between the peak power and the average power, is the most suitable, or it may even be an average power which then favors the signal L.

Figure 6:
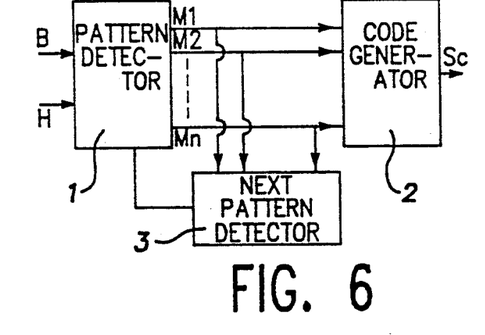
FIG. 6 is a functional diagram of a coder for generating a signal according to the coding method of the invention.

A functional diagram of a coder for the production a signals according to the coding method of the invention is represented on FIG. 6. This coder includes a device 1 receiving the binary digital signal B to be coded, as well as its clock signal H, for detecting on each bit time the possible presence of a binary pattern from the binary patterns M1 to Mn, a device 2 to produce, once the presence of a binary pattern is detected, a pulse occupying a temporal position corresponding to this binary pattern, the succession of the pulse thus produced forming the coded signal SC, and a device 3 to carry out the next detection, once the presence of a binary pattern is detected, from the bit following the last bit of this binary pattern.

The coded signal produced by the coder of FIG. 6 is transmitted, for example, to a laser source for it to be transmitted by optical fiber. It may be advantageous to decode the signal at the output of the decoder so as to check it is functioning properly. As these signals are properly calibrated and are noise-free and a clock is available, it is possible to use a decoder for this purpose, this decoder being more simple to use than a regenerator.

Figure 7:
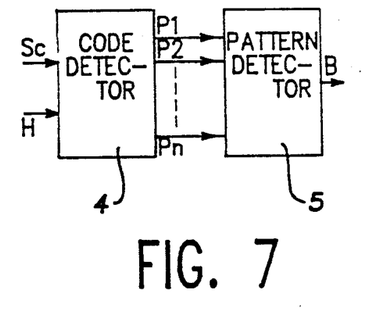
FIG. 7 is a functional diagram of a decoder for restoring in binary form a signal produced by a coder conforming to the invention.

A functional diagram of such a decoder is shown on FIG. 7. It includes a device 4 receiving the coded signal SC and the clock signal H and detecting, once the pulse is received, its temporal position P1 to Pn, and a device 5 to produce, once a pulse is detected in a temporal position, a binary pattern corresponding to said temporal position, the succession of these binary patterns forming a binary digital signal 8 identical to the one received by the coder.

The devices 1 to 5 may be embodied with the aid of conventional logical circuits whose implementation is well-known to experts in this field.

When the coded signal produced by the coder of FIG. 6 is derived from a transmission, its conversion into a digital signal is effected by means of a regenerator. One significant characteristic of such a regenerator concerns the binary error rate obtained on the regenerated digital signal according to the noise/signal ratio on its output. In the case of transmission by optical fiber, this characteristic directly has an effect on sensitivity at the input of the optical receiver and accordingly on the range of the link. The regeneration method of the invention makes it possible to convert a noised signal coded according to the method of the invention into a digital signal with a minimum error probability. In order to do this, firstly an API signal is produced to take a decision between a pulse absence and presence with a minimum error probability, and secondly a PTI signal to take a decision between two adjacent pulse temporal positions with a minimum error probability.

Figure 8:
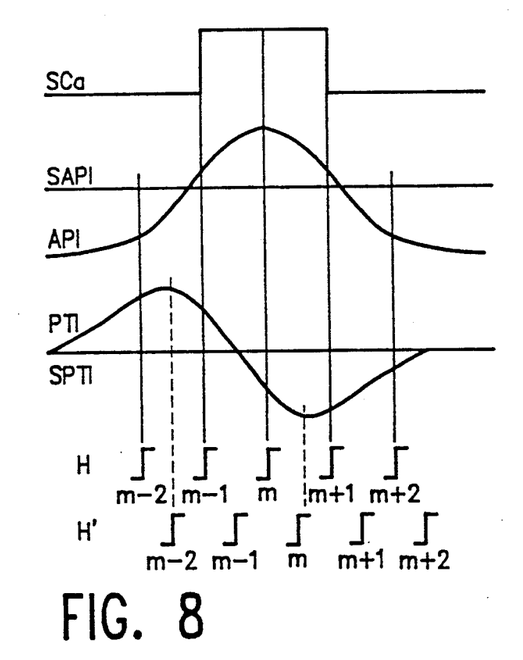
FIG. 8 is a timing diagram illustrating the regeneration method of the invention.

There now follows an explanation of the regeneration method of the invention with reference to the timing diagram of FIG. 8. This figure shows a coded signal SCa including a pulse occupying any temporal position Pm. The figure also shows the signals API and PTI derived from the signal SCa whose amplitudes are respectively compared with the thresholds SAPI and SPTI.

The position of the SAPI threshold is adjusted to minimize the error probability relating to the test on the API signal. When the level of noise affecting the API signal has the same value in the absence and presence of a pulse, the SAPI threshold is situated at mid-height of a pulse of the API signal. In the case of regenerating a coded signal derived from an optical fiber transmission, especially when an avalanche photodiode is used to receive the optical signal, the level of noise at the output of the optical receiver is clearly much higher in the presence of a pulse than in the absence of a pulse. In the presence of an optical pulse, a popcorn noise is added to the background noise, mainly thermic, of the photoreceptor. Also in this case, the SAPI threshold minimizing the error probability relating to the test on the API signal is no longer situated at mid-height of a Pulse of the API signal, but is situated in the position bringing it close to the amplitude of the API signal where a pulse is absent.

The position of the SPTI threshold is adjusted so as to minimize the error probability relating to the test on the PTI signal. For obvious reasons of symmetry, the position of the SPTI threshold, independently of the nature of the noise affecting the coded signal, still coincides with the amplitude of the PTI signal in the absence of any pulse.

The signals $H_{m-2}$ to $H_{m+2}$ are clock fronts indicating the dates of the tests conducted on the API and PTI signals to detect the presence of a pulse in the respective temporal positions $P_{m-2}$ to $P_{m+2}$. The clock front $H_m$ coincides with firstly the date on which the amplitude of the API signal passes through a maximum, and secondly with the date on which the amplitude of the PTI signal is equal to the difference between the amplitude on the date Pm+3T/4 and the amplitude on the date Pm-T/4 of the filtered signal Sca or, according to one variant, to the slope on the date Pm+T/4 of the filtered signal SCa.

The decision concerning the absence or presence of a pulse in a given temporal position thus depends on two conditions. On the date of the test corresponding to this temporal position, it is essential that the amplitude of the API signal is higher than the SAPI threshold and that the amplitude of the PTI signal is lower than the SPTI threshold.

Thus, in the example of FIG. 8, this first clock front authorizing the detection of the presence of a pulse in a temporal position is Hm. This detection then inhibits detection in the next two temporal positions corresponding to the clock fronts Hm+1 and Hm+2.

Figure 9A:
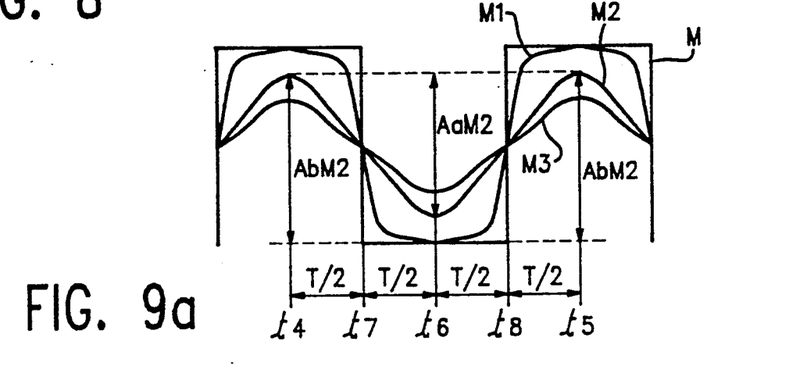
FIGS. 9a and 9b illustrate the effect of a low-pass filtering on respectively the form of a coded signal and on the ratio between the amplitude differences relating to this coded signal on the test dates and the level of noise.

It may be observed that on the date of the test corresponding to the clock front Hm−2, to be subsequently illustrated with reference to FIGS. 9a and 9b, the amplitude of the API signal is lower than the SAPI threshold without, however, being as far from it in the absence of any pulse, which increases the probability of an erroneous decision in favor of the "pulse presence" state. This does not constitute a drawback as the test conducted on the same date on the PTI signal does not validate this possibly erroneous decision.

The clock fronts H' correspond to the clock fronts H delayed by T/4. They may be used to carry out additional tests on the PTI signal and intended to confirm with a smaller error probability some of the tests corresponding to the clock fronts H. Thus, in order to decide on the presence of a pulse in the temporal position Pm, it is essential that the PTI signal is lower than the threshold SPTI for the two tests corresponding to Hm and H'm. In the example of FIG. 8, it shall be observed that only the tests corresponding to H'm−2 and H'm are advantageous as they take place when the amplitude of the PTI signal passes through maxima. For example, if on the date of the test corresponding to the clock front Hm−2, the API signal is affected by a noise making its amplitude slightly higher than the threshold SAPI and if the PTI signal is affected by a noise making its amplitude slightly lower than the threshold SPTI, the test corresponding to the clock front H'm−2 makes it possible to avoid there being any false detection of the presence of a pulse in the temporal position Pm−2.

The API signal is obtained by the low-pass filtering of the coded signal. Such a filtering makes it possible to minimize the error probability with reference to FIGS. 9a and 9b. FIG. 9a illustrates the action of a low-pass filter on a signal M composed of two pulses each having a period T and centered on the dates t4 and t5 so that t5−t4=2T. This figure shows the signal M and three other signals M1, M2 and M3 obtained by the low-pass filtering of the signal M with the respective band widths B1, B2 and B3 so that B1>B2>B3. The amplitude Aa represents the difference between the amplitude on the dates t4 or t5 and the amplitude on the date t6 centered between the dates t4 and t5 of the filtered signal M. It corresponds to the difference between the amplitudes relating to the states "0" and "1" in the case of regenerating an NRZ signal with a clock period of T. In fact, in this case, the tests carried out to take the decision between the states "0" and "1" take place periodically on dates spaced from T including t4, t6 and t5. The amplitude Ab represents the difference between the amplitude on the dates t4 or t5 and the amplitude in the absence of a pulse of the filtered signal M. It corresponds to the difference between the amplitudes relating to the "pulse presence" and "pulse absence" states in the case of regeneration according to the invention. In fact, the tests carried out to take the decision between the "pulse presence" and "pulse absence" states then periodically take place on dates spaced from T/2 including t4, t7, t6, t8 and t5, but as mentioned earlier with reference to FIG. 8, the tests on the dates t7 and t6 are inhibited when the presence of a pulse is detected in a temporal position centered on the date t4 and the tests on the dates t6 and t8 are not validated by the corresponding tests conducted on the PTI signal. It may be mentioned that, with regard to FIG. 7a where the amplitudes AaM2 and AbM2 relating to the signal M2 have been marked, the amplitude Ab is still higher than or equal to the amplitude Aa.

Figure 9B:
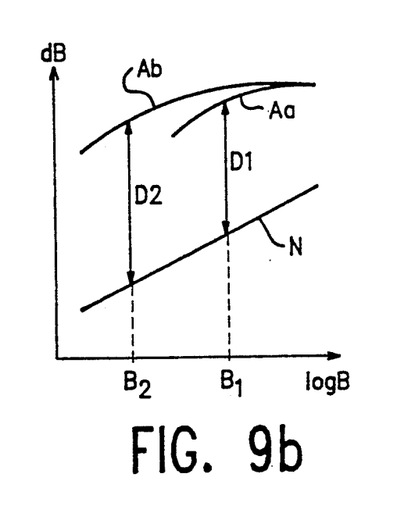

For better visual comprehension, FIG. 9b illustrates in logarithmic scales the evolution of these amplitudes Aa and Ab, as well as the noise power N, according to the width of the band B of the filter. Here, the noise power N is considered as being proportional to the band B. This figure clearly shows that there are band widths B1 and B2 for which the respective differences $$D1(dB) = Aa(dB) - N(dB) \quad \text{and}$$
$$D2(dB) = Ab(dB) - N(dB)$$

are maximal. It may also be observed that the band width B2 is smaller than the band width B1 and that the difference D2 is greater than the difference D1. As a result of this last point, for a given peak amplitude and a given period of the pulse prior to filtering and for identical noise conditions, the error probability concerning the decision between the "pulse absence" state and the "pulse presence" state shall be lower than the error probability concerning the decision between the state "0" and the state "1" in the case of regenerating an NRZ signal.

The PTI signal is produced from a signal also derived from a low-pass filtering of the coded signal. According to one production mode, the difference is made between the amplitudes of the previously filtered coded signal on two dates spaced from a period equal to the period of one pulse. According to another production mode, the slope of the previously filtered coded signal is taken. For each of these two production modes, a filtering band width is selected maximizing the ratio between the amplitude differences of the PTI signal on the dates of the tests and the level of noise.

By way of explanation, the two modes for producing the PTI signal have given similar experimental results. Moreover, in the presence of a uniform noise spectral density, the error probability relating to the test on the PTI signal was close to the error probability relating to the test on the API signal.

The regeneration method described above may be applied to the signals J, K or L of FIG. 5. However, as regards the signal J, the tests on the corresponding PTI signal shall not always be optimally conducted. In fact, the signal J exhibits one particular feature with respect to the signals K or L, namely that the difference between two consecutive pulses may reach a minimal value of T/2. One example of this particular feature is represented by the 3rd and 4th pulses of the signal J which respectively occupy a temporal position P2 corresponding to the binary pattern "11" and a temporal position P1 corresponding to the next binary pattern, "10". There now follows an examination of the effect on the PTI signal of this particular configuration of the coded signal with reference to FIG. 10.

Figure 10:
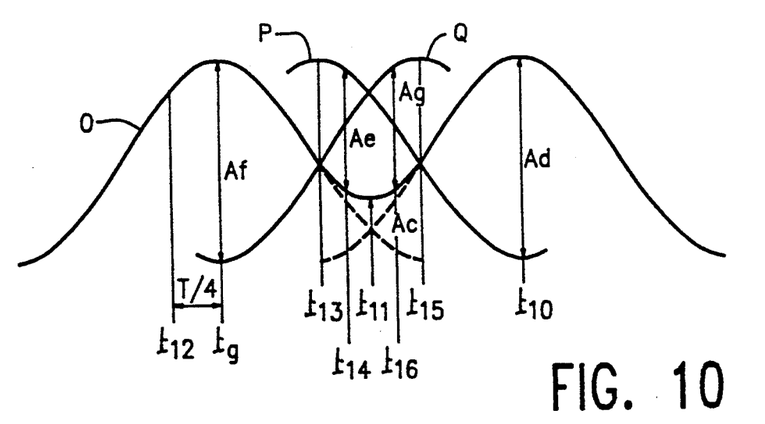
FIG. 10 illustrates a method to produce two additional signals to improve the error probability relating to validating the presence of a pulse in a temporal position when the signal to be regenerated is the signal J of FIG. 5.

This figure shows a signal O corresponding to the preceding particular configuration of the coded signal. This signal O is derived from the signal coded by the actual filtering in obtaining the PTI signal by making the difference between the amplitudes of the signal O on two dates spaced from a time equal to the period T of a pulse. The first pulse of the signal O, which occupies a temporal position P2, is centered on the date t9, and the second, which occupies a temporal position P1, is centered on the date t10 so that t10=t9+3T/2. On the date of the test of the presence of a pulse in the temporal position centered on the date t9, the amplitude of the PTI signal is equal to the difference between the amplitude of the signal O on the date t11 so that t11=t9+3T/4 and the amplitude of the signal O on the date t12 so that t12=t9−T/4. FIG. 10 shows that on the date t11, the signal O did not have the amplitude it would have in the absence of the second pulse in the position P1. In other words, on the date of the test, the PTI signal shall have an amplitude reduced from the amplitude Ac. This constitutes a drawback as this results in an increase of the error probability relating to the test on the PTI signal and accordingly an increase of the error probability concerning the regenerated binary signal.

It is possible to overcome this drawback. In fact, in the example of FIG. 10, on the date of the test for the presence of a pulse in the temporal position centered on the date t9, the role of the PTI signal is to make it possible to remove the ambiguity between the temporal position centered on the date t9 and the temporal position centered on the date t13 so that t13=t9+T/2. It has been seen that this cannot be effected optimally because on the date t11 the difference between the amplitude of the signal O and the amplitude of the signal P representing a pulse centered on the date t13 was reduced from the amplitude Ac. Now, there are two dates, namely t10 and t14, so that t14≃t9+5T/8 for which the differences of opposing directions between the amplitudes, respectively Ad and Ae, of the signals 0 and P pass through maxima. In addition, the sum Ad+Ae is sufficient to allow for a test with a non-penalizing error probability. Thus, it is possible to produce a signal PTI' suitable for the carrying out of a test to remove the ambiguity between the temporal position centered on the date t9 and the temporal position centered on the date t13 by carrying out the difference between the amplitudes of the filtered coded signal used to obtain the PTI signal on two dates spaced from a period equal to t10-t14. Thus, on the date of the test for the presence of a pulse in the temporal position centered on the date t9, there shall be validation of the test on the API signal if the amplitude of the PTI signal is lower than the threshold SPTI or even if the amplitude of the signal PTI' is greater than a threshold SPTI' centered in the amplitude interval equal to Ad+Ae.

It has been observed that with reference to FIG. 8, the test on the API signal on the date corresponding to the clock front Hm−2 is affected by an increased probability of an erroneous decision in favor of the "pulse presence" state and that this possible erroneous decision is not validated by the test on the PTI signal. On the other hand, it may be validated by the test on the new PTI' signal which, on this date, exhibits an amplitude close to its threshold. It is thus necessary in this case to carry out an additional test so as to avoid taking into account the validation relating to the signal PTI'.

With reference again to FIG. 10, it has been observed that the purpose of this additional test is to remove the ambiguity between the presence of a pulse centered on the date t9 and the presence of a pulse, represented by the signal Q, centered on the date t15 so that t15=t9+T. It has also been observed that on the dates t9 and t16 so that t16≃t9+7T/8, the differences of opposing directions between the respective amplitudes Af and Ag of the signals O and Q pass through maxima. In addition, the sum Af+Ag is sufficient to allow for a test with a non-penalizing error probability. The additional test may thus take place on a PTI" signal obtained by making the difference between the amplitudes of the filtered coded signal used for obtaining the signal PTI on two dates spaced from a period equal to t16−t9 which, for reasons of symmetry, is also equal to t10-t14. The signal PTI" shall thus be identical to the signal PTI' with a time lag equal to about 5T/8 and it shall be compared to an "SPTI" threshold centered in the amplitude interval equal to Af+Ag.

The regeneration of a signal conforming to the signal J of FIG. 5 thus requires, if it is desired to avoid degrading the error probability concerning the regenerated binary signal, the implementation of two additional signals PTI' and PTI". On the date of the test corresponding to the temporal position P2, a detection of the presence of a pulse relating to the API signal shall only be validated if the following equation is verified:

$$\overline{LPTI''}.(LPTI'+\overline{LPTI})=1$$

in which the logical signals LPTI, LPTI' and LPTI" have the logical value "1" when the amplitude of the respective signals PTI, PTI' and PTI" is higher than their respective threshold on the date of the test.

In the preceding description, a method for obtaining the signals PTI' and PTI" has been shown. According to one variant, these signals are obtained by taking the slope, on a date centered between the dates t10 and t14, respectively t9 and t16, of the filtered coded signal with a band width which maximizes the ratio between the amplitude differences on the date of the tests and the noise.

Figure 11:
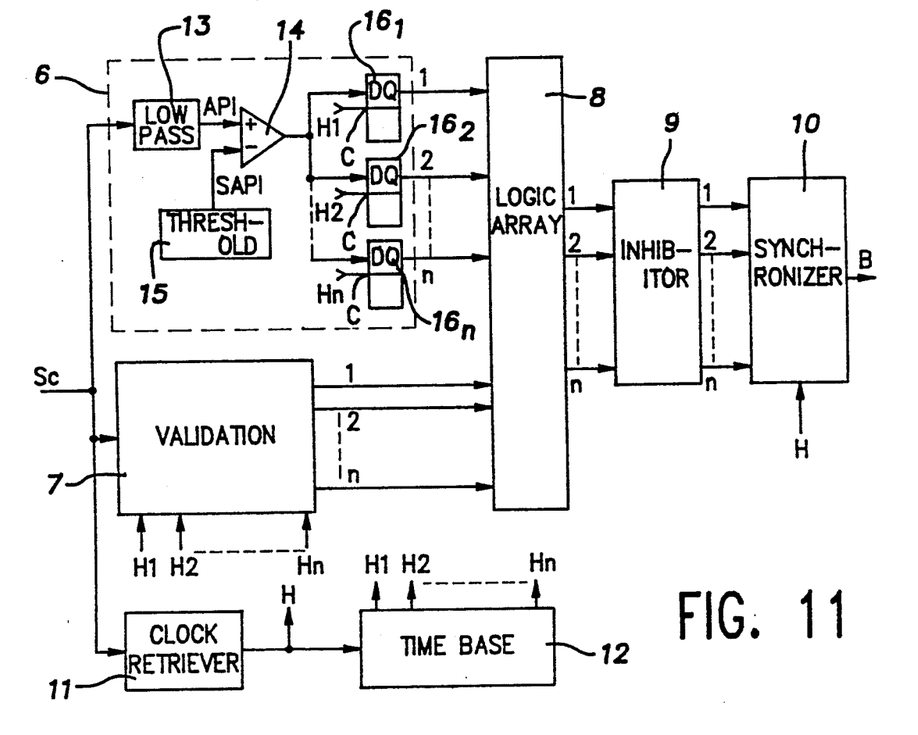
FIG. 11 represents an embodiment of a regenerator for restoring in binary form a signal produced by a coder conforming to the invention and derived from a transmission.

There now follows a description of an embodiment of a regenerator implementing the regeneration method of the invention with reference to FIG. 11. This regenerator includes a device 6 for carrying out a test for the absence/presence of a pulse receiving the coded signal SC and the clock signals H1 to Hn, and delivering respectively n pulse absence/presence logical signals in relation with the signal H1 to Hn. It further includes a device 7 to carry out a validation test for the presence of a pulse receiving the same coded signal SC and the same clock signals H1 to Hn, and delivering respectively n pulse presence logical validation signals in relation with the signals H1 to Hn. This regenerator also includes a set 8 of n logical operators for carrying out the validation operations, a device 9 to inhibit any validated detection of the presence of a pulse in the two temporal positions following the temporal position in which the validated presence of a pulse is detected, a device 10 to produce in synchronism with the clock signal H, when the validated presence of a pulse is detected in a temporal position P1 to Pn, a binary pattern M1 to Mn corresponding to said temporal position, the succession of these binary patterns forming a binary digital signal B identical to the one received by the coder from which the coded signal SC is derived. This regenerator finally includes a clock retrieval device 11 and a time base 12 to produce the signals H1 to Hn.

A device 6 to carry out a pulse absence/presence test includes a low-pass filter 13 producing an API signal applied to the non-inverter input of a comparator 14 whose inverter input receives a threshold voltage SAPI derived from a device 15 which may be a potentiometer or even a device for automatically controlling the threshold according to the amplitude of the signal SC at the input of the regenerator. The signal present at the output of the comparator 14 is applied to the input D of master/slave flip-flops $16_1$ to $16n$ which receive on their input C the signals H1 to Hn and which deliver on their output $\overline{Q}$ n pulse presence/absence logical signals.

Figure 12A:
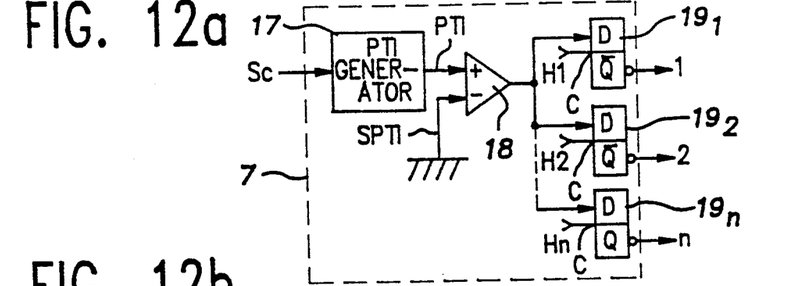
FIGS. 12a and 12b represent an embodiment of a device to carry out a pulse presence validation test for respectively each of n temporal positions and for each of two temporal positions when the signal to be regenerated is the signal J of FIG. 5, FIGS. 13a and 13b represent two embodiments of a device to produce a signal suitable for the carrying out of a pulse presence validation test.

A device 7 to carry out a pulse presence validation test is represented on FIG. 12a. It includes a device 17 receiving the coded signal and producing a PTI signal which feeds the non-inverter input of a comparator 18 whose inverter input is connected to the ground. In fact, it has been seen with reference to FIG. 8 that the position of the threshold SPTI coincided with the amplitude of the PTI signal in the absence of a pulse, this amplitude here being equal to a nil voltage. The signal delivered on the output of the comparator 18 is applied to the input D of the master/slave flip-flops $19_1$ to $19n$ which receive on their input C the signals H1 to Hn and which deliver on their output Q n pulse presence validation logical signals.

Figure 12B:
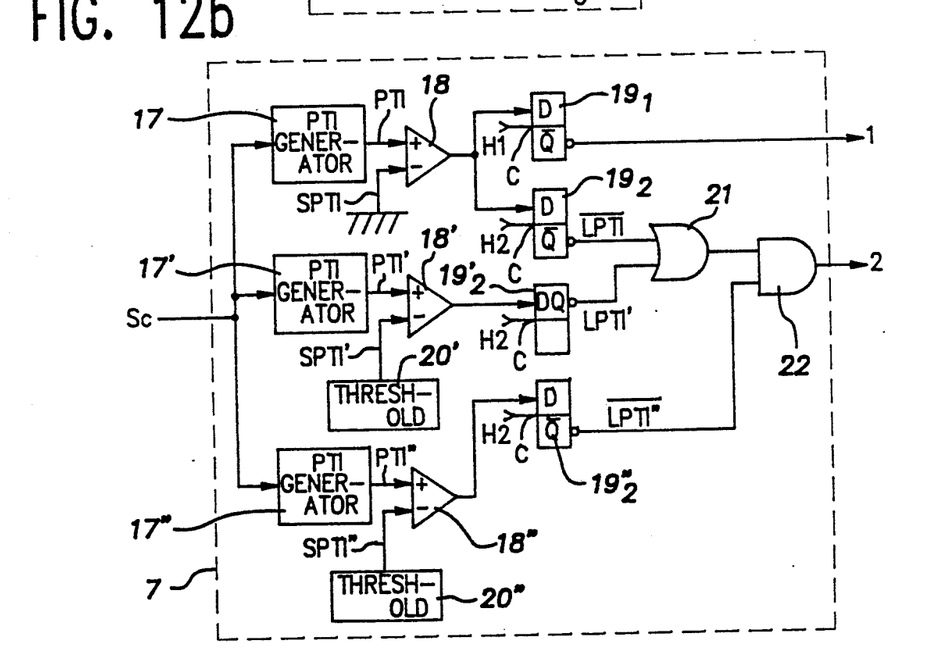

FIG. 12b represents a device 7 to carry out a pulse presence validation test for the regeneration of a signal coded conforming to the signal J of FIG. 5 with a non-degraded error probability. It includes devices 17, 17' and 17" receiving the coded signal SC and respectively producing the signals PTI, PTI' and PTI" which respectively feed the non-inverter input of the comparators 18, 18' and 18" whose inverter input is respectively connected to the ground delivering the threshold voltage SPTI and to the devices 20' and 20" identical to the device 15 respectively delivering the threshold voltages SPTI' and SPTI". The signal delivered on the output of the comparator 18 is applied to the input D of the master/slave flip-flops $19_1$ and $19_2$ which receive on their input C the signals H1 and H2 respectively, and the signals delivered on each output of the comparators 18' and 18" are respectively applied to each input D of the master/slave flip-flops $19'_2$ and $19''_2$ which receive on their input C the same signal H2. The flip-flop $19_1$ delivers on its output $\overline{Q}$ the logical validation signal for the presence of a pulse in the temporal position P1. The gate OR 21 receives the logical signals $\overline{LPTI}$ and LPTI' respectively delivered on the output Q of the flip-flop $19_2$ and on the output $\overline{Q}$ of the flip-flop $19'_2$. The gate ET 22 receives the output signal of the gate 21 and the logical signal $\overline{LPTI''}$ delivered on the output $\overline{Q}$ of the flip-flop $20''_2$ and delivers the presence validation logical signal of a pulse in the temporal position P2.

Figure 13A:
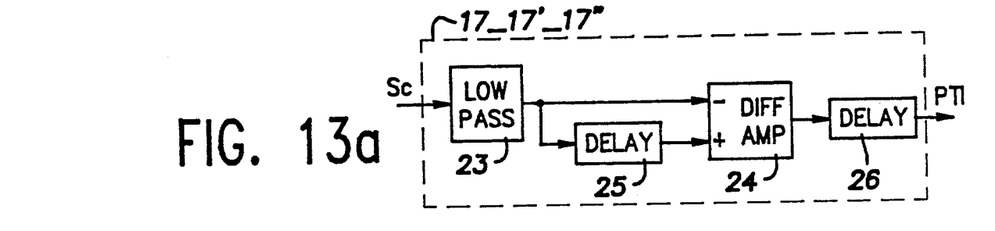

A device, respectively 17, 17' or 17" to produce a signal, respectively PTI, PTI' or PTI", is represented on FIG. 13a. It includes a low-pass filter 23 receiving the coded signal SC and, according to a mode for producing the signal PTI, PTI' or PTI" respectively, a differential input amplifier 24 receiving on its inverter input the filtered coded signal and on its non-inverter input this same signal having traversed a delay line 25. Thus, a signal PTI, PTI' or PTI" is respectively produced by using a delay equal to 2T/n, respectively about 7T/8. The signal PTI, PTI' or PTI" respectively delivered on the output of the amplifier 24 then traverses a delay line 26 so that its temporal position conforms to the clock signals H1 to Hn and H2 respectively. These clock signals also conform to the temporal position of the API signal.

Figure 13B:
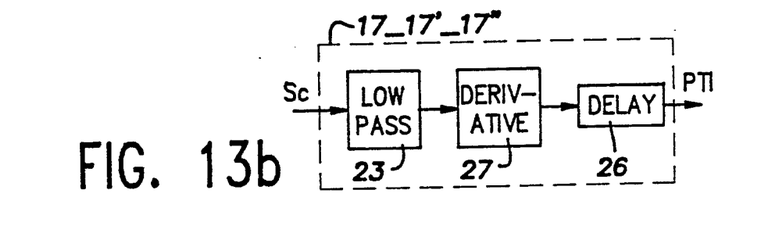

FIG. 13b represents a device 17, 17' or 17" respectively for producing a signal PTI, PTI' or PTI" respectively according to another mode. The elements 24 and 25 are here replaced by a differential circuit 27 which takes the slope of the filtered coded signal. There now follows an explanation on how it is possible to retrieve the clock of a signal coded according to the method of the invention. As this coded signal is made up of pulses, all synchronous with a frequency n/T, it is possible to generate from this signal a line on the frequency n/T. Then a signal on the frequency 1/T is obtained by dividing by n a signal derived from this line on the frequency n/T. So as to deliver a clock signal having a correct phase, it is necessary to have available additional information in order to synchronize the division by n concerning the appropriate period of the signal on the frequency n/T. When the coded signal is the signal J, K or L of FIG. 5, this additional information may be obtained by marking pulses separated by a time interval characteristic of a particular configuration for which these two pulses still occupy a given temporal position. For example, in the case of the signal J, it is possible to mark the pulses spaced from 3T/2, a configuration in which the first pulse is still in the temporal position P2 and the second in the temporal position P1. In the case of the signals K or L, it is possible to mark the pulses spaced from 2T, a configuration in which the two pulses are still in the temporal position P1.

When the binary patterns, whose presence is detected are "100", "110", "111" and "101" for example, there are no longer any pulses separated by a time interval characteristic of such a particular configuration. It is then possible to obtain the information in order to synchronize the division by n concerning the appropriate period of the signal on the frequency n/T by counting the average number of pulses per unit of time in each temporal position. In fact, the average frequencies of the occurrence of the various binary patterns are not generally identical for a random or pseudo-random digital signal. For example, in the case of the binary patterns "100", "110", "111" and "101", the binary pattern "101" repeats about 1.5 times more often than the binary pattern "100". Thus, it is possible to mark the various temporal positions by comparing the average numbers of pulses per unit of time present in each of them.

Figure 14A:
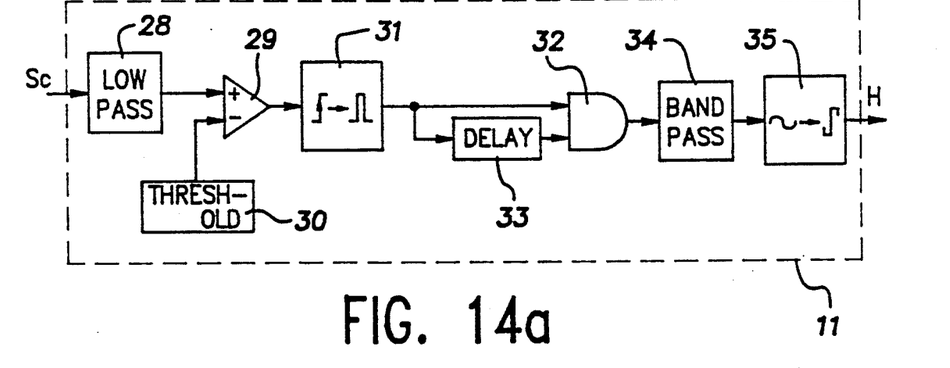
FIGS. 14a, 14b and 14c represent embodiments of a device to retrieve the clock of the transmitted signal.

One embodiment of a clock retrieval device 11 for a coded signal, such as the signal J, K or L of FIG. 5, is represented on FIG. 14a. The coded signal SC is applied, after passage in a low-pass filter 28, to the non-inverter input of a comparator 29 whose inverter input is connected to a device 30, identical to the device 15, delivering a threshold voltage. This threshold voltage and the band width of the low-pass filter 28 are adjusted so as to minimize the "haunch" affecting the transitions present on the output of the comparator 29. The rising transitions are converted into pulses with a period less than or equal to T/n with the aid of the flip-flop 31. The gate ET 32 receives these pulses, firstly directly and secondly after passage in a delay line 33. The delay brought about is equal to the characteristic spacing to be marked, for example 3T/2 in the case of the signal J, and 2T in the case of the signal K or L. Thus, the pulses delivered by the gate ET 32 are all synchronous with the clock H and form a signal whose energy spectrum contains a line on the frequency H which is isolated by the device 34 which may, for example, be a narrow band selective filter, an oscillator synchronized by injection or an oscillator associated with a phase locking loop. The pulse shaper 35 transforms the sinusoidal signal on the frequency 1/T delivered by the device 34 into a logical clock signal H.

The clock signal thus obtained does not exhibit significant spectral purity. In fact, the average number per unit of time of the pulses delivered by the gate 32 is small in front of the frequency 1/T and accordingly the ratio between the energy of the line on the frequency 1/T and the energy of the spectrum close to this line is small.

Figure 14B:
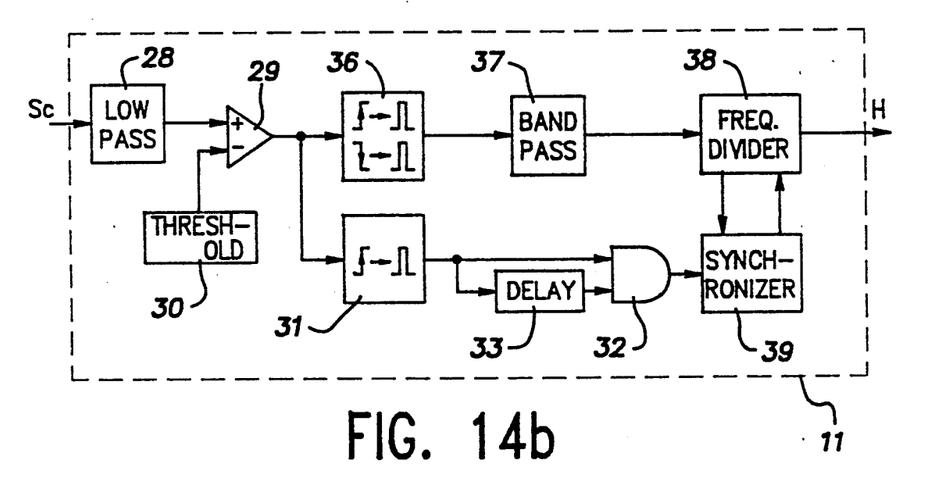

One embodiment of a clock retrieval device 11 procuring the highest spectral purity is represented on FIG. 14b. It includes the same elements 28 to 33 as the embodiment of FIG. 14a with also a flip-flop 36 which produces a pulse with a period less than or equal to T/n for each transition, rising or falling, produced by the comparator 29. Thus, a signal is obtained whose spectrum contains a line on the frequency n/T, and the ratio between the energy of this line and the energy of the neighbouring spectrum is here much larger. This line on the frequency n/T is then isolated by the device 17 which, like the device 34, may be a narrow band selective filter, an injection-synchronized oscillator or an oscillator associated with a phase locking loop. Thus, it is possible to obtain a signal on the frequency 1/T by dividing by n the signal on the frequency n/T. This simple division by n is not sufficient to produce the clock signal H as there is now a phase ambiguity. In order to remove this ambiguity, it is necessary that the division by n is synchronized with the appropriate periods of the signal on the frequency n/T. These operations are effected with the aid of an n divider 38 associated with a synchronization device 39 receiving the pulses delivered by the gate 32 and which, as has been seen previously, are all synchronous with the clock H. The action of the synchronization device 39 may be advantageously affected by an integration time constant with the aim of avoiding losing the correct phase of the clock in the presence of a single pulse in an erroneous temporal position on the output of the gate 32.

Figure 14C:
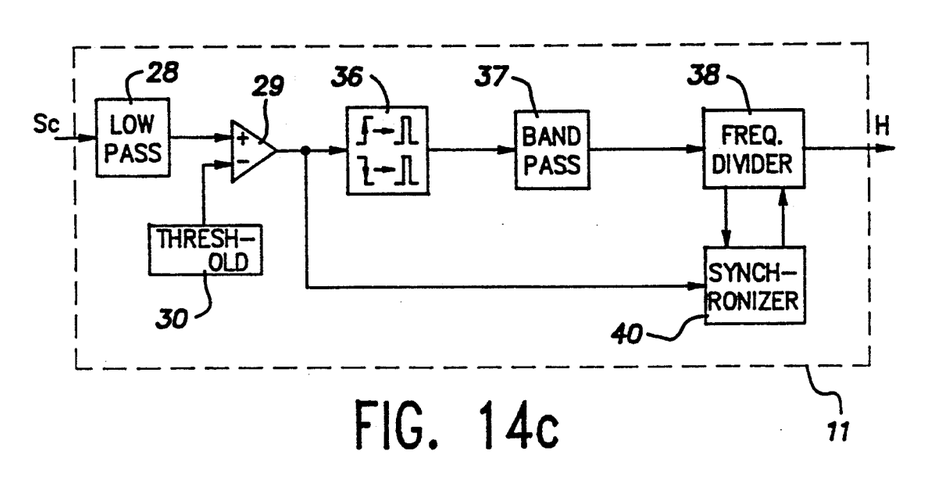

One embodiment of a clock retrieval device for a coded signal in which the pulses correspond to binary patterns, whose average frequencies of occurrence are different, is represented on FIG. 14c. It includes the same elements 28, 29, 30, 36, 37 and 38 as the embodiment of FIG. 14b with in addition a synchronization device 40 associated with the divider 38 receiving the pulses delivered by the comparator 29 so as to count the average number of pulses per unit of time for at least two temporal positions for which the average frequencies for the occurrence of the corresponding binary patterns have particularly remote values.

What is claimed is:

1. A decoder to restore a series of binary bits coded by coding the series of binary bits into the form of unipolar pulses of constant duration, one of said bits occurring each period of time called a bit time, the coding being performed by providing "n" binary patterns having at least a first bit and a last bit each, said binary patterns matching less than all possible sequences in said series, dividing the bit time into "n" temporal positions, establishing a correspondence between each of said binary patterns and temporal positions, detecting one of said binary patterns in said series, generating one of said pulses in the temporal position corresponding to the binary pattern detected, and after the last bit of the binary pattern detected, and after the last bit of the binary pattern detected, resuming said detecting step, said decoder comprising means to detect the presence of a pulse occupying a temporal position from the "n" temporal positions, and means to produce, once the presence of a pulse is detected in said temporal position, the binary pattern corresponding to this temporal position.

2. Regenerator to regenerate a signal coded by coding the series of binary bits into the form of unipolar pulses of constant duration, one of said bits occurring each period of time called a bit time, the coding being performed by providing "n" binary patterns having at least a first bit and a last bit each, said binary patterns matching less than all possible sequences in said series, dividing the bit time into "n" temporal positions, establishing a correspondence between each of said binary patterns and temporal positions, detecting one of said binary patterns in said series, generating one of said pulses in the temporal position corresponding to the binary pattern detected, and after the last bit of the binary pattern detected, resuming said detecting step, wherein a first signal (API) is formed by low-pass filtering of said coded signal, said first signal having an amplitude, a first comparison test is carried out between said amplitude of said first signal and a first threshold (SAPI), said first threshold being adjusted so as to minimize the error probability, a second signal (PTI) is formed by low-pass filtering of said coded signal, said second signal having an amplitude, a second comparison test is carried out between said amplitude of said second signal (PTI) and a second threshold (SPTI), said second threshold being adjusted to the amplitude of said second signal in the absence of any pulse, a decision is made concerning the absence or presence of a pulse in a given temporal position of said coded signal depending on the results of said first and second comparison tests, the presence of a pulse being decided only when the amplitude of said first signal is higher than said first threshold and the amplitude of the second signal is lower than said second threshold at the time the first and second tests are carried out, the regenerator comprising a device to conduct a pulse absence/presence test for each of "n" temporal positions, a device to carry out a pulse presence validation test for each of "n" temporal positions, a set of "n" logical operators to carry out the validation operation,, a device to inhibit any validation detection of the presence of a pulse in the two temporal positions following the temporal position in which the validated presence of a pulse is detected, a device to produce, once the validated presence of a pulse is detected in a temporal position, a binary pattern corresponding to this temporal position, a device to retrieve the clock of the transmitted signal and a time base to produce the control signals of the pulse absence/presence and pulse presence validation tests for each of "n" temporal positions.

3. Regenerator according to claim 2, wherein the device to carry out a pulse absence/presence test for each of n temporal positions includes a low-pass filter receiving the coded signal, a comparator receiving on its non-inverter input the filtered coded signal and on its inverter input a threshold voltage delivered by a device and feeding the input D of n master/slave flip-flops.

4. Regenerator according to claim 2, wherein the device to carry out a pulse presence validation test for each of n temporal positions includes a device receiving the coded signal and producing a suitable signal for carrying out a test for validating the presence of a pulse and which feeds the non-inverter input of a comparator whose inverter input is connected to the ground, and n master-slave flip-flops whose input D is fed by the comparator.

5. Regenerator according to claim 2 in which n=2, wherein the device to carry out a pulse presence validation test for each of the two temporal positions includes means receiving the coded signal and producing suitable signals for carrying out a pulse presence validation test, these means feeding the non-inverter input of the comparators whose inverter input is respectively connected to the ground and means delivering threshold voltages, two master/slave flip-flops whose input D is fed by the comparators, a gate OR with one input being connected to the output $\overline{Q}$ of the flip-flop and the other to the output Q of the flip-flop, a gate ET with one input being connected to the output of the gate OR and the other input to the output $\overline{Q}$ of the flip-flop.

6. Regenerator according to either claim 4 or 5, wherein the device to produce a suitable signal for carrying out a pulse presence validation test includes a low-pass filter receiving the coded signal, a differential input amplifier receiving on its inverter input a filtered coded signal and on its non-inverter input this same signal having traversed a delay line and delivering a signal traversing a delay line.

7. Regenerator according to claim 2, wherein the device to retrieve the clock of the signal transmitted includes a low-pass filter receiving the coded signal, a comparator whose non-inverter input receives the filtered coded signal and the inverter input a threshold voltage delivered by a device, and feeding a flip-flop delivering one pulse for each rising transition, a gate ET receiving on one input the signal delivered by the flip-flop and on the other input this same signal having traversed a delay line, and a narrow band selective filtering device connected to the output of the gate ET and followed by a pulse shaper.

8. Regenerator according to claim 2, wherein the device to retrieve the clock of the transmitted signal includes a low-pass filter receiving the coded signal, a comparator whose non-inverter input receives the filtered coded signal and the inverter input, a threshold voltage delivered by a device and feeding a first flip-flop delivering one pulse for each rising transition, a gate ET receiving on one input the signal delivered by the flip-flop and on the other input this same signal having traversed a delay line, and a second flip-flop connected to the comparator and delivering one pulse for each rising transition and each falling transition, a narrow band selective filtering device connected to the second flip-flop, and an "n" divider connected to the selective filtering device and associated with a synchronization device receiving the signal delivered by the gate ET.

9. Regenerator according to claim 2, wherein the device to retrieve the clock of the transmitted signal includes a low-pass filter receiving the coded signal, a comparator whose non-inverter input receives the filtered coded signal and the inverter input a threshold voltage delivered by a device, a flip-flop connected to the output of the comparator and delivering one pulse for each rising transition and each falling transition, a narrow band selective filtering device connected to the flip-flop, an "n" divider connected to the selective filtering device and a synchronization device associated with the divider and receiving the signal delivered by the comparator.

10. A method of coding a series of binary bits into the form of unipolar pulses of constant duration, one of said bits occurring each period of time called a bit time, the method comprising:
 providing "n" binary patterns having at least a first bit and a last bit each, said binary patterns matching less than all possible sequences in said series;
 dividing the bit time into "n" temporal positions;
 establishing a correspondence between each of said binary patterns and temporal positions;
 detecting one of said binary patterns in said series;
 generating one of said pulses in the temporal position corresponding to the binary pattern detected; and
 after the last bit of the binary pattern detected, resuming said detecting step.

11. A method according to claim 10, wherein each pulse has a period twice that separating two adjacent temporal positions.

12. Method according to claim 10, wherein the binary patterns are: "10" and "11", or "10", "110" and "111", or "11", "100" and "101", or "10", "11" and any number of consecutive "0's", or "10", "110", "1110" and "1111", or "100", "110", "111" and "101", or "10", "110", "111" and any number of consecutive "0's", or "100", "11", "101" and any number of consecutive "0's".

13. A method to regenerate an output coded signal, wherein a first signal (API) is formed by low-pass filtering of said coded signal, said first signal having an amplitude, a first comparison test is carried out between said amplitude of said first signal and a first threshold (SAPI), said first threshold being adjusted so as to minimize the error probability, a second signal (PTI) is formed by low-pass filtering of said coded signal, said second signal having an amplitude, a second comparison test is carried out between said amplitude of said second signal (PTI) and a second threshold (SPTI), said second threshold being adjusted to the amplitude of said second signal in the absence of any pulse, a decision is made concerning the absence or presence of a pulse in a given temporal position of said coded signal depending on the results of said first and second comparison tests, the presence of a pulse being decided only when the amplitude of said first signal is higher than said first threshold and the amplitude of the second signal is lower than said second threshold at the time the first and second tests are carried out.

14. A method according to claim 13, wherein said second signal is obtained by subtracting said coded signal at a first time and said coded signal at a second time, said first and second times being spaced apart by a period equal to a period of a pulse of said coded signal.

15. A coder for coding a series of binary bits into the form of unipolar pulses of constant duration, one of said bits occurring each period of time called a bit time, the coder comprising:
 means for detecting any of "n" binary patterns in said series where each said binary pattern has at least a first bit and a second bit and match less than all possible sequences in said series;

means for generating said pulses in any of "n" temporal positions contained in a bit time where each temporal position corresponds to a respective binary pattern, a pulse in the temporal position corresponding to the binary pattern detected being generated; and means for detecting the last bit of the binary pattern detected and causing the means for detecting to continue in response thereto.

* * * * *

UNITED STATES PATENT AND TRADEMARK OFFICE
CERTIFICATE OF CORRECTION

PATENT NO. : 5,151,698
DATED : September 29, 1992
INVENTOR(S) : Lucian Pophillat It is certified that error appears in the above-indentified patent and that said Letters Patent is hereby corrected as shown below:

On the title page: Item [73] Assignee, line 3, "(centre" should be --(Centre--.

Column 5, line 60, the sentence beginning with "This" should start a new paragraph.

Column 5, line 67, the sentence beginning with "A" should start a new paragraph.

Column 6, lines 25, 26, "Position" should be --position--.

Column 8, line 52, "Pulse" should be --pulse--.

Column 16, line 6, delete "binary pattern detected, and after the last bit of the".

Column 16, line 53, after "operation," delete --,--.

Signed and Sealed this

Sixteenth Day of November, 1993

*Attest:*

BRUCE LEHMAN

*Attesting Officer*     *Commissioner of Patents and Trademarks*